United States Patent
Harvey

(10) Patent No.: US 9,950,239 B1
(45) Date of Patent: Apr. 24, 2018

(54) HITTING TRAINING DEVICE

(71) Applicant: Kevin Harvey, Douglasville, GA (US)

(72) Inventor: Kevin Harvey, Douglasville, GA (US)

( * ) Notice: Subject to any disclaimer, the term of this patent is extended or adjusted under 35 U.S.C. 154(b) by 0 days.

(21) Appl. No.: 15/340,050

(22) Filed: Nov. 1, 2016

(51) Int. Cl.
*A63B 69/00* (2006.01)
*A63B 71/06* (2006.01)
*A63B 69/36* (2006.01)
*A63B 69/38* (2006.01)

(52) U.S. Cl.
CPC ...... *A63B 71/0622* (2013.01); *A63B 69/0002* (2013.01); *A63B 69/3608* (2013.01); *A63B 69/38* (2013.01); *A63B 2069/0008* (2013.01); *A63B 2071/0625* (2013.01); *A63B 2220/836* (2013.01)

(58) Field of Classification Search
USPC ....... 473/207, 209, 212, 215, 219, 221, 223; 434/247–258
See application file for complete search history.

(56) References Cited

U.S. PATENT DOCUMENTS

| | | | |
|---|---|---|---|
| 4,392,830 A * | 7/1983 | Salzman | A63B 69/00 434/258 |
| 4,502,035 A * | 2/1985 | Obenauf | A63B 69/3608 340/323 R |
| 4,605,226 A | 8/1986 | Morrissey | |
| 4,869,509 A * | 9/1989 | Lee | A42B 1/24 2/209.13 |
| 5,005,835 A * | 4/1991 | Huffman | A63B 69/3608 273/DIG. 17 |
| D325,612 S | 4/1992 | Longo | |
| 5,108,104 A * | 4/1992 | Johnson | A63B 69/3608 434/252 |
| 5,251,902 A * | 10/1993 | Federowicz | A63B 69/3608 473/209 |
| 5,447,305 A * | 9/1995 | Socci | A42B 3/0433 473/458 |
| 5,474,299 A | 12/1995 | Romano | |
| 5,976,037 A | 11/1999 | Watson | |
| 7,383,728 B2 * | 6/2008 | Noble | A61B 5/1116 600/595 |
| 7,572,192 B1 | 8/2009 | Boyd | |
| 8,157,663 B1 | 4/2012 | Winkelsas | |
| 2003/0002705 A1* | 1/2003 | Boesen | H04M 1/6066 381/380 |
| 2005/0059870 A1* | 3/2005 | Aceti | A61B 5/0002 600/340 |

(Continued)

FOREIGN PATENT DOCUMENTS

WO   9825675 A1   6/1998

*Primary Examiner* — Nini Legesse

(57) ABSTRACT

The hitting training device is a training device used for practicing a swing by an athlete. The hitting training device is an earbud that contains a level sensor. The earbud is worn during the practice of a swing. The level sensor detects if the head of the athlete tilts off level off during the swing. In this circumstance, the level sensor activates a buzzer that audibly and physically indicates that the head tilted inappropriately. The hitting training device comprises an earbud, a level sensor, a signaling unit and a power system. The level sensor, signaling unit and the power system are contained within the earbud. The earbud is worn in the ear of the athlete much like a Bluetooth earbud commonly used with cellular phones.

8 Claims, 4 Drawing Sheets

(56) References Cited

U.S. PATENT DOCUMENTS

2008/0165017 A1\* 7/2008 Schwartz ............. A61B 5/0002
340/573.1
2012/0157243 A1\* 6/2012 Gallo ................. A63B 69/0002
473/438

\* cited by examiner

FIG. 6
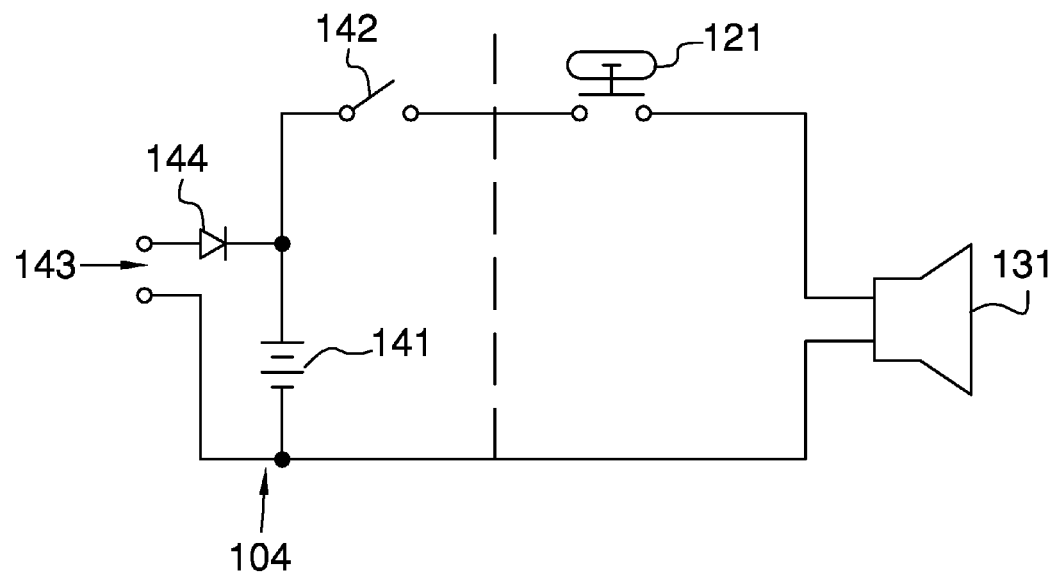
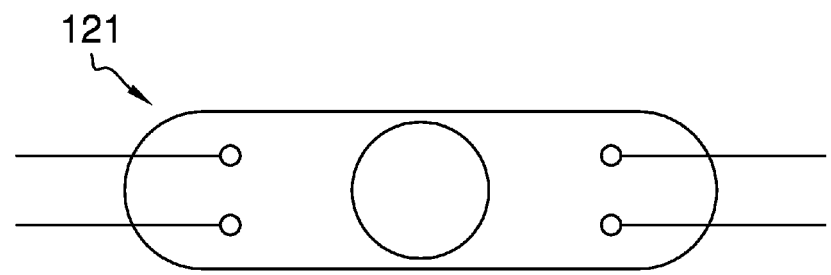
FIG. 7

HITTING TRAINING DEVICE

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sports, games, and amusements including apparatus for physical training, more specifically, measuring physical parameters during sporting activities.

SUMMARY OF INVENTION

The hitting training device is a training device used for practicing a swing by an athlete. The hitting training device is an earbud that contains a level sensor. The earbud is worn during the practice of a swing. The level sensor detects if the head of the athlete tilts off level off during the swing. In this circumstance, the level sensor activates a buzzer that audibly and physically indicates that the head tilted inappropriately. The hitting training device comprises an earbud, a level sensor, a signaling unit and a power system. The level sensor, signaling unit and the power system are contained within the earbud. The earbud is worn in the ear of the athlete much like a Bluetooth earbud commonly used with cellular phones.

These together with additional objects, features and advantages of the hitting training device will be readily apparent to those of ordinary skill in the art upon reading the following detailed description of the presently preferred, but nonetheless illustrative, embodiments when taken in conjunction with the accompanying drawings.

In this respect, before explaining the current embodiments of the hitting training device in detail, it is to be understood that the hitting training device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hitting training device.

It is therefore important that the claims be regarded as including such equivalent construction insofar as they do not depart from the spirit and scope of the hitting training device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a schematic view of an embodiment of the disclosure.

FIG. 7 is a detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
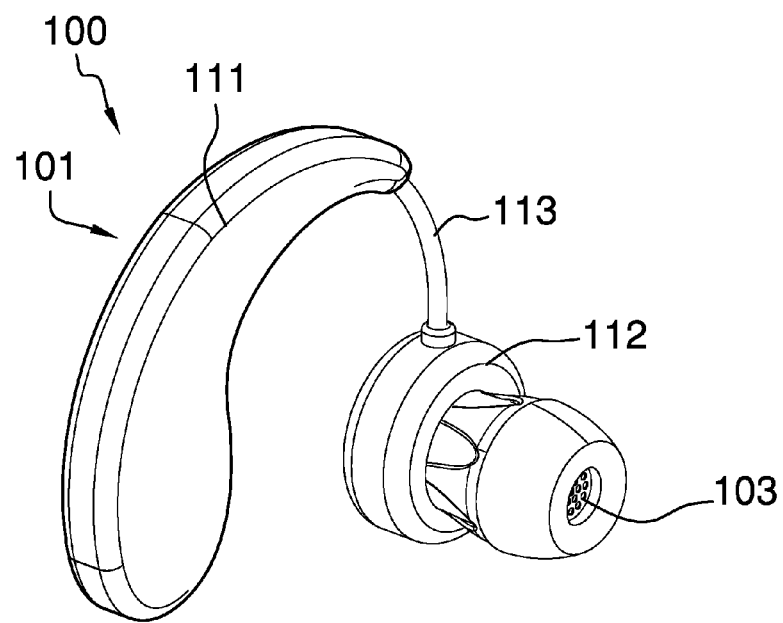
FIG. 1 is a perspective view of an embodiment of the disclosure.
Figure 2:
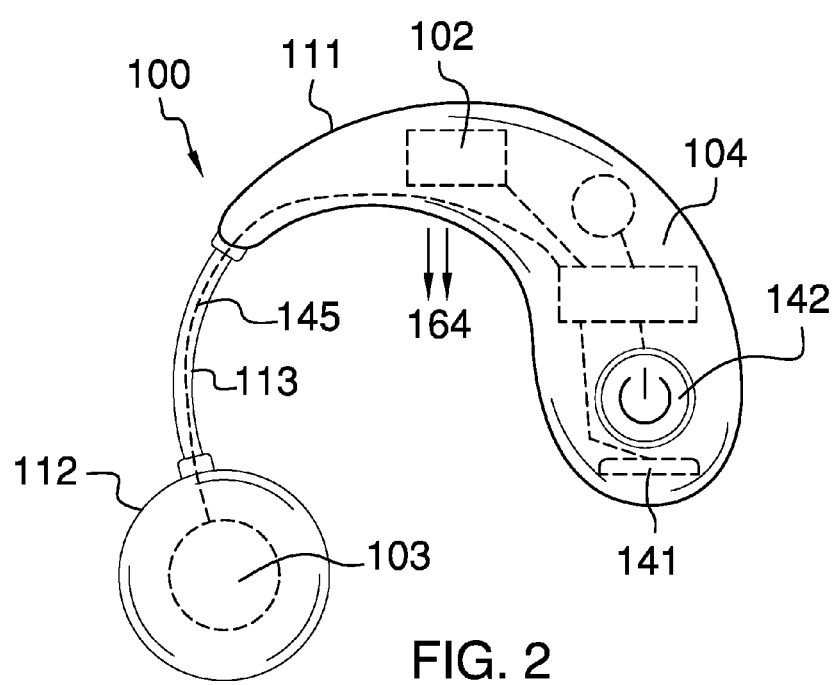
FIG. 2 is a front view of an embodiment of the disclosure.
Figure 3:
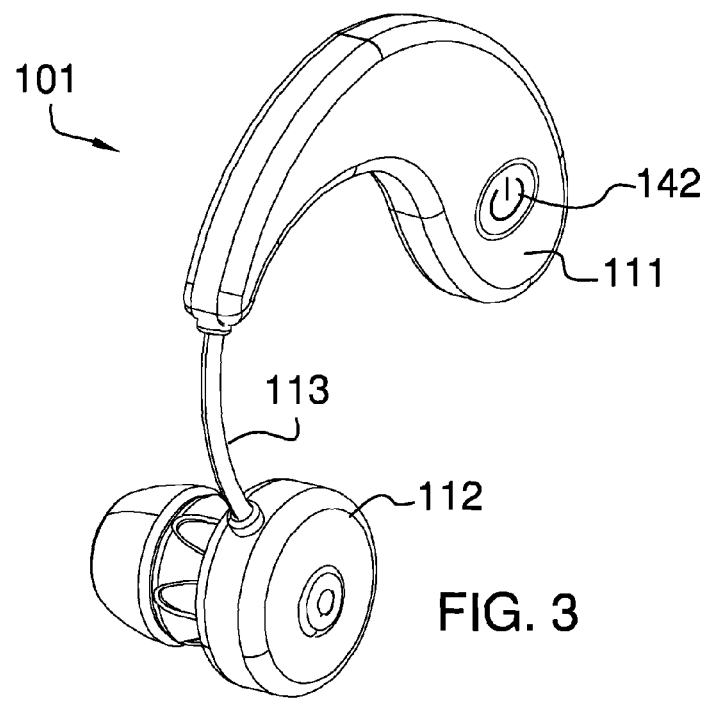
FIG. 3 is a reverse perspective view of an embodiment of the disclosure.
Figure 4:
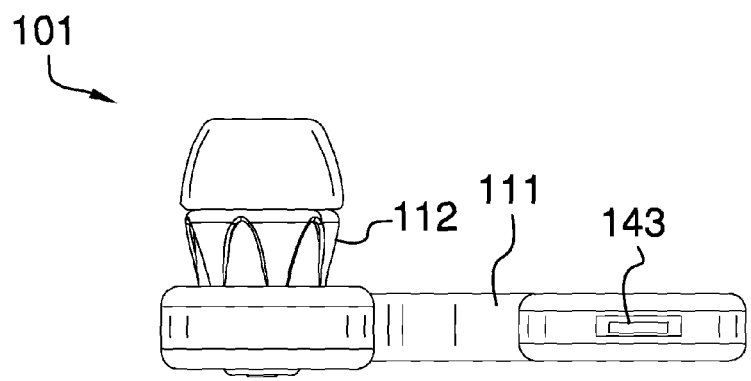
FIG. 4 is a bottom view of an embodiment of the disclosure.
Figure 5:
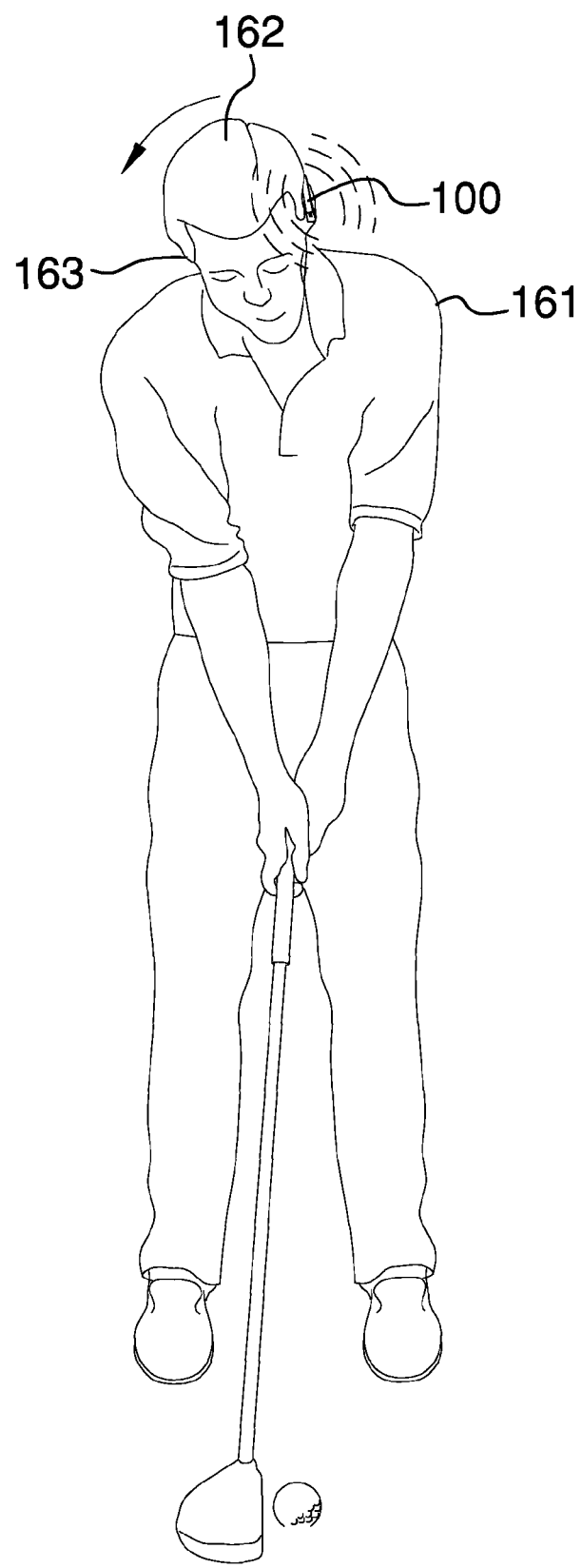
FIG. 5 is an in use view of an embodiment of the disclosure.

Detailed reference will now be made to one or more potential embodiments of the disclosure, which are illustrated in FIGS. 1 through 7.

The hitting training device 100 (hereinafter invention) comprises an earbud 101, a level sensor 102, a signaling unit 103 and a power system 104. The level sensor 102, signaling unit 103 and the power system 104 are contained within the earbud 101. The earbud 101 is worn in the ear 163 of an athlete 161 much like a Bluetooth earbud commonly used with cellular phones. The invention 100 is a training device used for practicing a sport that involves a swinging motion. Such sports include, but are not limited to, golf, baseball, and tennis. The invention 100 is an earbud 101 that contains a level sensor 102. The earbud 101 is worn during the practice of the swing. The level sensor 102 detects if the head 162 of the athlete 161 tilts off level off during the swing. In this circumstance, the level sensor 102 activates a signaling unit 103 that audibly and physically indicates that the head 162 tilted inappropriately.

The earbud 101 is a structure that contains the balance of the invention 100. The earbud 101 is formed in the shape of an earbud 101 used with cellular phones. The earbud 101 is worn over the ear 163 of the athlete 161 such that a speaker 112 is inserted into the ear 163. The earbud 101 comprises a housing 111, a speaker 112, and a flexible tube 113. The housing 111 is a chamber that contains the level sensor 102 and the power system 104. The speaker 112 contains a transducer that generates electrical signals into audible sounds and a vibration. The speaker 112 is the portion of the earbud 101 that is inserted into the ear 163 of the athlete 161. The speaker 112 is connected to the housing 111 using a flexible tube 113. The flexible tube 113 is a hollow tubular semi-rigid structure. The hollow tubular semi-rigid structure is not elastic in nature. The flexible tube 113 adjusts the fit of the earbud 101 within and around the ear 163 of the athlete 161.

The level sensor 102 is used to determine the position of the head 162 relative to gravity 164. The level sensor 102 is positioned within the housing 111 such that when the head 162 of the athlete 161 is in the proper position the level sensor 102 is perpendicular to the force of gravity 164. As shown most clearly in FIG. 7, the level sensor 102 is a commercially available tilt switch 121. In the first potential embodiment of the disclosure, the tilt switch 121 is a metal ball tilt switch 121 that completes an electrical circuit whenever the head 162 of the athlete 161 is not perpendicular to the force of gravity 164. The closure of the electrical circuit activates the signaling unit 103 indicating to the athlete 161 that the head 162 moved in an inappropriate manner during the swing. In the second potential embodiment of the disclosure, the tilt switch 121 is a mercury switch 121 that completes an electrical circuit whenever the head 162 of the athlete 161 is not perpendicular to the force of gravity 164. The closure of the electrical circuit activates the signaling unit 103 indicating to the athlete 161 that the head 162 moved in an inappropriate manner during the swing.

In the first potential embodiment of the disclosure, the signaling unit 103 comprises a buzzer 131. The buzzer 131 is a commercially available buzzer 131 that generates an audible sound and a physical vibration when a voltage is applied to the buzzer 131. The buzzer 131 is mounted within the speaker 112 of the earbud 101. An electrical cable 145 connecting the buzzer 131 to the tilt switch 121 and the power system 104 is threaded through the hollow tubular semi-rigid structure of the flexible tube 113.

As shown most clearly in FIG. 6, the power system 104 comprises a battery 141, a switch 142, a port 143, and a diode 144. The battery 141 is a commercially available battery 141. The chemical energy stored within the battery 141 is used to power the buzzer 131 when the invention 100 is in use. The chemical energy stored within the battery 141 is renewed and restored through use of the port 143. The port 143 is an electrical circuit that reverses the polarity of the battery 141 and provides the energy necessary to reverse the chemical processes that the battery 141 initially used to generate the electrical energy. This reversal of the chemical process recreates a chemical potential energy that will later be used to generate electricity. In the first potential embodiment of the disclosure, the port 143 is a commercially available USB port 143. A diode 144 is installed between the port 143 and the battery 141 such that electricity flow is limited to the direction from the port 143 to the positive terminal of the battery 141. The installation and recharging of batteries within electrical circuits are well known and documented in the electrical arts.

As shown in FIG. 6, the switch 142 is a commercially available switch 142 that connects the battery 141 to tilt switch 121 and the buzzer 131 in a series circuit. The switch 142 disables the operation of the invention 100 when the invention 100 is not in use.

To use the invention 100, the earbud 101 is placed in the ear 163 of the athlete 161 and the switch 142 is closed. The athlete 161 then practices their swing in a normal manner. Should the head 162 of the athlete 161 move in an inappropriate manner, the resulting motion of the tilt switch 121 causes the circuit between the signaling unit 103 and the battery 141 to be completed such that the signaling unit 103 is activated. The activation of the signaling unit 103 creates an audible sound and a vibration that is sensed by the athlete 161. Once training is completed, a plug carrying a USB based source of power is plugged into the port 143.

The following definitions were used in this disclosure:

Battery: As used in this disclosure, a battery is a container consisting of one or more cells, in which chemical energy is converted into electricity and used as a source of power.

Buzzer: As used in this disclosure, a buzzer is two lead electrical device that generates an audible sound when voltage is applied to the two leads.

Diode: As used in this disclosure, a diode is a two terminal semiconductor device that allows current flow in only one direction. The two terminals are called the anode and the cathode. Electric current is allowed to pass from the anode to the cathode.

Elastic: As used in this disclosure, an elastic is a material or object that deforms when a force is applied to it and that is able to return to its original shape after the force is removed. A material that exhibits these qualities is also referred to as an elastomeric material.

Port: As used in this disclosure, a port is an electrical termination that is used to connect a first electrical circuit to a second external electrical circuit. In this disclosure, the port is designed to receive a plug. Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical device that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tilt Switch: As used in this disclosure, a tilt switch is a switch that is actuated by angle of the switch relative to a reference direction. In many applications, the reference direction will be the force of gravity. Common tilt switch technologies include, but are not limited to, mercury switches and metal ball tilt switches.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS.

1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A training device comprising:
   an earbud, a level sensor, a signaling unit and a power system;
   wherein the level sensor, signaling unit and the power system are contained within the earbud;
   wherein the earbud is worn in an ear of an athlete;
   wherein the athlete is further defined with a head;
   wherein the training device is a used for practicing a sport that involves a swinging motion;
   wherein the earbud is worn during the practice of the swing;
   wherein the level sensor detects if the head of the athlete tilts off level off during the swing;
   wherein the level sensor activates the signaling unit that audibly and physically indicates that the head tilted inappropriately;
   wherein the earbud comprises a housing, a speaker, and a flexible tube;
   wherein the earbud is worn over the ear of the athlete such that a speaker is inserted into the ear;
   wherein the housing is a chamber that contains the level sensor and the power system;
   wherein the speaker contains a transducer that generates electrical signals into audible sounds and a vibration;
   wherein the speaker is connected to the housing using a flexible tube;
   wherein the flexible tube is a hollow tubular semi-rigid structure;
   wherein the hollow tubular semi-rigid structure is not elastic;
   wherein the level sensor determines the position of the head relative to gravity;
   wherein the level sensor is positioned within the housing such that when the head of the athlete is in the proper position the level sensor is perpendicular to the force of gravity;
   wherein the level sensor is a tilt switch;
   wherein the signaling unit comprises a buzzer;
   wherein the buzzer generates an audible sound and a physical vibration when a voltage is applied to the buzzer;
   wherein the buzzer is mounted within the speaker of the earbud;
   wherein an electrical cable connecting the buzzer to the tilt switch and the power system is threaded through the hollow tubular semi-rigid structure of the flexible tube;
   wherein the power system comprises a battery and a port;
   wherein the battery powers the buzzer when the training device is in use;
   wherein the battery is recharged through the port.

2. The training device according to claim 1
   wherein the tilt switch is a metal ball tilt switch that completes an electrical circuit whenever the head of the athlete is not perpendicular to the force of gravity;
   wherein the closure of the electrical circuit activates the signaling unit.

3. The training device according to claim 2
   wherein the power system further comprises a diode;
   wherein the diode is installed between the port and the battery such that electricity flow is limited to the direction from the port to the positive terminal of the battery.

4. The training device according to claim 3
   wherein the power system further comprises a switch;
   wherein the switch disables the operation of the training device when the training device is not in use.

5. The training device according to claim 4 wherein the switch is connects to a series circuit comprising the tilt switch and the signaling unit.

6. The training device according to claim 1
   wherein the tilt switch is a mercury tilt switch that completes an electrical circuit whenever the head of the athlete is not perpendicular to the force of gravity;
   wherein the closure of the electrical circuit activates the signaling unit.

7. The training device according to claim 6
   wherein the power system further comprises a diode;
   wherein the diode is installed between the port and the battery such that electricity flow is limited to the direction from the port to the positive terminal of the battery.

8. The training device according to claim 7
   wherein the power system further comprises a switch;
   wherein the switch disables the operation of the training device when the training device is not in use.

* * * * *